United States Patent
Uyeno et al.

(10) Patent No.: US 11,212,010 B2
(45) Date of Patent: Dec. 28, 2021

(54) OPTICALLY-STEERED RF IMAGING RECEIVER USING PHOTONIC SPATIAL BEAM PROCESSING

(71) Applicant: Raytheon Company, Waltham, MA (US)

(72) Inventors: Gerald P. Uyeno, Tucson, AZ (US); Sean D. Keller, Tucson, AZ (US); Benn Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 59 days.

(21) Appl. No.: 16/821,530

(22) Filed: Mar. 17, 2020

(65) Prior Publication Data

US 2021/0297161 A1    Sep. 23, 2021

(51) Int. Cl.
*H04B 10/61*    (2013.01)
*H04B 1/16*    (2006.01)
*H04B 10/2575*    (2013.01)

(52) U.S. Cl.
CPC ........... *H04B 10/6165* (2013.01); *H04B 1/16* (2013.01); *H04B 10/25759* (2013.01); *H04B 2210/006* (2013.01)

(58) Field of Classification Search
None
See application file for complete search history.

(56) References Cited

U.S. PATENT DOCUMENTS

| | | | | |
|---|---|---|---|---|
| 6,122,084 A | * | 9/2000 | Britz | H04B 10/0775 385/140 |
| 7,587,141 B2 | * | 9/2009 | Fisher | H04B 10/1125 398/128 |
| 9,525,489 B2 | | 12/2016 | Schuetz et al. | |
| 9,800,346 B2 | | 10/2017 | Schuetz et al. | |
| 10,164,712 B2 | | 12/2018 | Schuetz et al. | |
| 2003/0021522 A1 | * | 1/2003 | Ducellier | G02B 6/356 385/17 |
| 2003/0043471 A1 | * | 3/2003 | Belser | G02B 6/29313 359/634 |

(Continued)

OTHER PUBLICATIONS

Dennis W. Prather, "5G Moves into the light: Holographic massive MIMO," ComSoc Technology News, http://www.comsoc.org/ctn/5g-moves-into-light-holographic-massive-mimo, Jun. 2016, pp. 1-5.

(Continued)

*Primary Examiner* — Darren E Wolf
(74) *Attorney, Agent, or Firm* — Schwegman Lundberg & Woessner, P.A.

(57) ABSTRACT

An RF imaging receiver using photonic spatial beam processing is provided with an optical beam steerer that acts on the individual modulated optical signals to induce individual phase delays that produce a phase delay with a linear term, and possibly spherical or aspherical terms, across a two-dimensional wavefront of the composite optical signal to steer the composite optical signal and move the location of the spot on the optical detector array. The optical beam steerer may change the path length or a refractive index for each of the modulated optical signals to induce the requisite phase delays. The optical beam steerer may be implemented, for example, with a Risley prism or liquid crystal or MEMs spatial light modulator.

8 Claims, 6 Drawing Sheets

(56) References Cited

U.S. PATENT DOCUMENTS

| | | | | |
|---|---|---|---|---|
| 2005/0074204 | A1* | 4/2005 | Wilson | G02B 6/29383 385/24 |
| 2006/0222290 | A1* | 10/2006 | Yamashita | G02B 6/3586 385/18 |
| 2007/0070060 | A1* | 3/2007 | Kagawa | G06T 1/00 345/418 |
| 2009/0275929 | A1* | 11/2009 | Zickler | A61F 9/00804 606/5 |
| 2010/0221002 | A1* | 9/2010 | Ooi | H04J 14/0213 398/48 |
| 2014/0355991 | A1* | 12/2014 | Cameirao | H04B 10/27 398/79 |
| 2015/0229397 | A1* | 8/2015 | Shibata | H04B 10/25753 398/115 |

OTHER PUBLICATIONS

Macario et al., "Full spectrum millimeter-wave modulation," Oct. 8, 2012 / vol. 20, No. 21 / Optics Express, pp. 23623-23629.

Schneider et al., "Radiofrequency signal-generation system with over seven octaves of continuous tuning," http://www.nature.com/doifinder/10.1038/nphoton.2012.339, pp. 1-5.

Wang et al., "Photonic Generation of High Fidelity RF Sources for Mobile Communications," DOI 10.1109/JLT.2017.2707411, Journal of Lightwave Technology, 2016, pp. 1-7.

Deroba et al., "Smart Antenna Using Element-level Photonic Upconversion to Generate an Apodized Beam-space for Increased Spatial Isolation," IEEE Antennas and Wireless Propagation Letters, vol. ??, 2017, pp. 1-4.

Shi et al., "Ultrawideband Optically Fed Tightly Coupled Phased Array," Journal of Lightwave Technology, vol. 33, No. 23, Dec. 1, 2015, pp. 4781-4790.

Shi et al., "Conformal Wideband Optically Addressed Transmitting Phased Array With Photonic Receiver," Journal of Lightwave Technology, vol. 32, No. 20, Oct. 15, 2014, pp. 3468-3477.

Murakowski et al., "Photonic probing of radio waves for k-space tomography," vol. 25, No. 14 | Jul. 10, 2017 | Optics Express, pp. 15746-15759.

Schuetz et al., "A Promising Outlook for Imaging Radar," IEEE Microwave Magazine, May 2018, pp. 91-101.

* cited by examiner

OPTICALLY-STEERED RF IMAGING RECEIVER USING PHOTONIC SPATIAL BEAM PROCESSING

BACKGROUND OF THE INVENTION

Field of the Invention

This invention relates to radar systems, and more specifically to imaging receivers that upconvert signals from the RF spectrum to an optical band to provide an image of an RF scene.

Description of the Related Art

Since its conception in the early 1900's, Radar systems have mostly used a single RF beam to probe the environment in search of objects of interest.

Traditionally, this is done by scanning the beam over a region of interest and using tie of flight to determine the range of objects located within the beam. As such, a key figure of merit is the spatial extent and angular divergence of the RF beam, as it defines the lateral (or cross-range) resolution of detectable object. In addition, the operational bandwidth of the Radar determines the range resolution of detectable objects. In combination, these two metrics define the overall capability of the Radar system.

With the evolution of Radar systems developing from single analog RF beam transceivers to multi-beam digital systems, they have expanded their capability to illuminate, detect, and track multiple targets simultaneously. This being the case, there is typically a limit as to the number of beams a given Radar system can simultaneously transmit/receive (Tx/Rx) and the bandwidth over which it can operate. This relationship is commonly referred to as the beam-bandwidth product (BBP).

An imaging Radar system would form literally hundreds of millions of beams every fraction of a second by virtue of using a lens to provide spatial beam forming from every point source in a rendered scene. A range-gated system could add a range component to provide 3D imaging. However, this would require a BBP that is currently unavailable using modern electronics technology.

Christopher A. Schuetz et. al "A Promising Outlook for Imaging Radar: Imaging Flash Radar Realized Using Photonic Spatial Beam Processing" IEEE Microwave Magazine, vol. 19.3.91-101 (2018) and related U.S. Pat. No. 10,164,712 entitled "Phased-Array Radio Frequency Receiver" describe a passive millimeter wave (PmmW) imaging receiver that overcomes the BBP limitation. Incoming RF signals are received at each of a plurality of antenna elements that are arranged in a first pattern. The received RF signals from each of the plurality of antenna elements are electronically amplified via low noise amplifiers (LNAs) and modulated onto an optical carrier to generate a plurality of modulated optical signals that each have at least one sideband. The modulated optical signals are directed along a corresponding plurality of optical channels with outputs arranged in a second pattern corresponding to the first pattern. A composite optical signal is formed using light emanating from the outputs of the plurality of optical channels. Non-spatial information contained in at least one of the received RF signals is extracted by an optical detector in the form of an image of an RF scene within a field of view of the receiver.

A key aspect of the proposed approach is the conversion to optical wavelengths for processing. One potential downside of this process is that the process is now sensitive to phase variation in the optical fibers. A phase control process compares each channel of the array against a common coherent reference. This comparison is accomplished by separating the optical carrier from the modulated sidebands using a thin film filter and beating them against the reference on a low speed photodiode array resulting in a beat tone whose phase relative to the ramp frequency is representative of the phase through the optical path. Using these tones the phase is derived and a simple low speed phase calibration is implemented on each channel, which can be the same modulation used to encode the mmW signals. In this manner, the phases of each element of the array can be electronically adjusted via electronic delay elements at the outputs of the low noise amplifiers that act on the respective electrical signals to achieve a wide range of added functionality such as beam steering, electronically adjustable focus for near field applications, and engineering of the point spread function.

These RF imaging receivers and particularly ones incorporating sparse phased arrays, may not provide the required angle-angle location precision for certain applications. In short, these RF imaging receivers, which have less resolution than traditional optical imaging receivers, lack the capability to provide sub-pixel resolution of the target.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an optically-steered RF imaging receiver using photonic spatial beam processing. The receiver is configured to convert received RF signals into modulated optical signals to focus a composite optical signal into a "spot" on an optical detector array and extract an image of an RF scene within a field of view of the receiver. An optical beam steerer is configured to act on the individual modulated optical signals to induce individual phase delays that produce a phase delay with a linear term across a two-dimensional wavefront of the composite optical signal to steer the composite optical signal at a steering angle and move the location of the spot on the optical detector.

In different embodiments, the optical beam steerer is positioned at the input to the receiver's beam combiner or at an internal interface of the beam combiner before the formation of the composite optical signal.

In different embodiments, the optical beam steerer is implemented with a Risley prism or a liquid crystal (transmission or reflection mode) or MEMs spatial light modulator. The optical beam steerer is configured to vary the relative effective path lengths of the modulated optical signals to steer the composite optical signal. This may be accomplished either by directly varying the path lengths, varying the path lengths signals propagate through a constant refractive index or by varying the refractive indices to act on the individual modulated optical signals to induce the phase delays.

In an embodiment, an existing RF imaging receiver is retrofit with the optical beam steerer to provide beam steering capability.

In different embodiments, the RF imaging receiver is configured to image a portion of the RF band between 0-300 GHz or a portion of the mmW band between 30-300 GHz. In different embodiments, the same design of the optical beam steerer can be used for different RF imaging receivers spanning the RF spectrum from 0-300 GHz. The optical signals occupy a portion of the optical spectrum between in the near Infrared (NIR) band between 0.7 and 3.0 microns (~100 to ~430 THz).

In the different embodiments, the LC and MEMs SLM provide the capability to address each channel independently. In some cases, it may be desirable to change the individual phase delays applied to the channels independently thereby producing a non-linear phase delay across the two-dimensional wavefront of the composite optical signal. Depending on how the individual phase is changed, the non-linear phase delay may include spherical or aspherical terms in addition to the linear phase term. The linear phase term dictates the coarse steering of the composite optical signal. Spherical and Aspherical terms allow for fine tuning of the steering angle, through methods such as focusing power and wavefront correction.

These and other features and advantages of the invention will be apparent to those skilled in the art from the following detailed description of preferred embodiments, taken together with the accompanying drawings, in which:

DETAILED DESCRIPTION OF THE INVENTION

In the present invention, an RF imaging receiver (passive or active) is provided with an optical beam steerer to move the location of the focus (e.g. the "spot") on the optical detector array. The optical beam steerer acts on the individual modulated optical signals to induce individual phase delays that produce a phase delay with a linear term across a two-dimensional wavefront of the composite optical signal to steer the composite optical signal. The optical beam steerer is configured to vary the relative effective path lengths of the modulated optical signals to steer the composite optical signal. This may be accomplished either by directly varying the path lengths, varying the path lengths signals propagate through a constant refractive index or by varying the refractive indices to act on the individual modulated optical signals to induce the phase delays. The optical beam steerer may be implemented, for example, with a MEMs spatial light modulator (SLM) that directly varies path lengths, a Risley prism that varies the path lengths signals pass through a constant refractive index or a liquid crystal SLM that varies the refractive indices that act on the different signals. The SLM implementations allow for independent control of the optical channels to introduce spheric or aspheric terms to the phase delay.

Although more expensive and cumbersome to implement than standard electronic beam steering, optical beam steering offers certain advantages. First, the same optical beam steering system can be used for a 3 GHz RF signal or a 300 GHz RF signal. By comparison, the electronics required to implement electronic beam steering must be designed for a particular RE. Furthermore, if the RF band required for a particular RF scene is too broad the electronic beam steering will be degraded. Second, an optical beam steering system can be "retrofit" to an existing RF imaging receiver without changing the receiver. Implementation of electronic beam steering requires a redesign of the receiver electronics. Certain embodiments such as the Risley prisms are immune to EMI.

Figure 1:
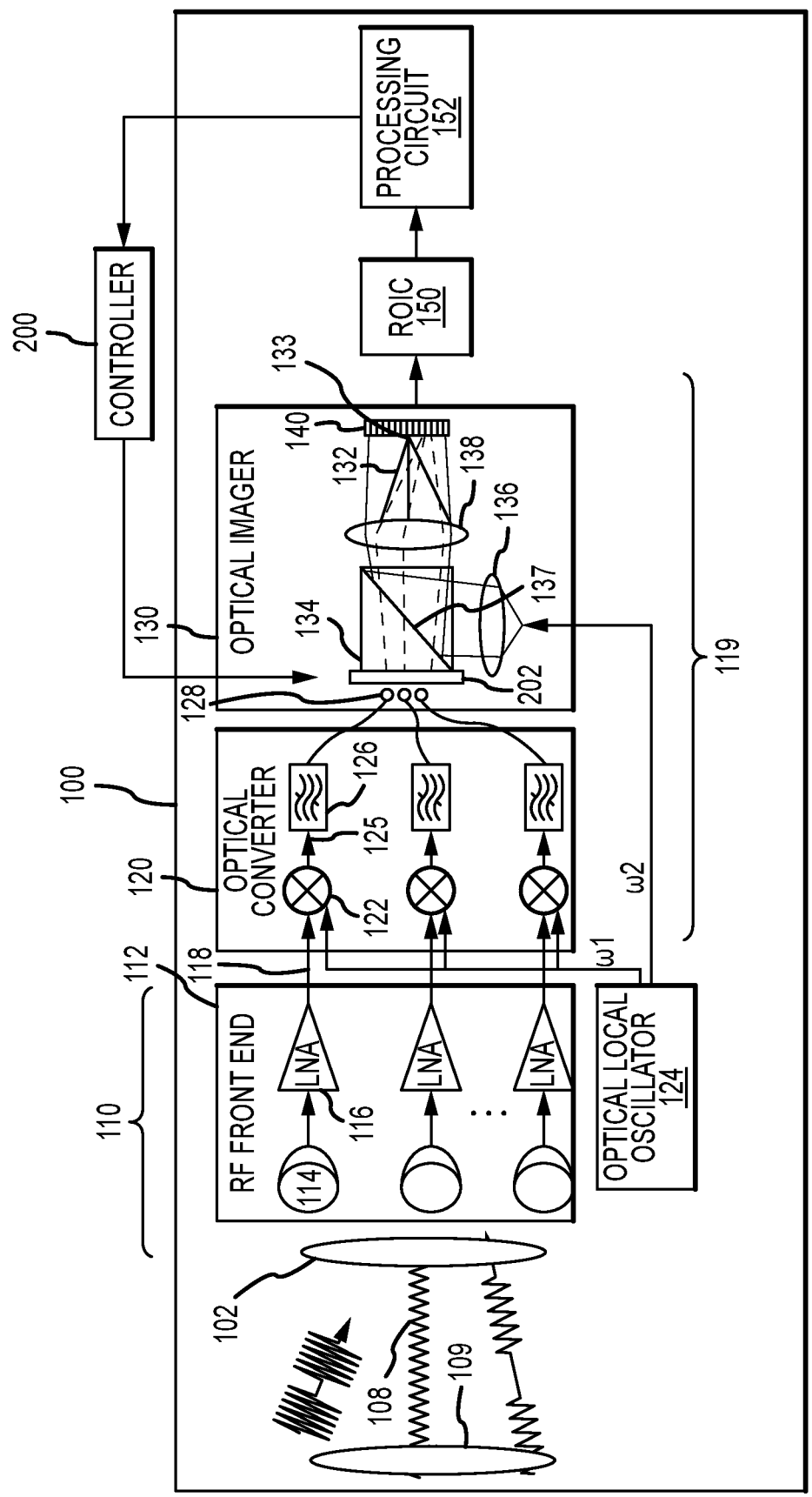
FIG. 1 is a block diagram of an embodiment of an optically-steered RF imaging receiver using photonic spatial beam processing.

Referring now to FIG. 1, an RF imaging receiver 100 is coupled to an electronic aperture 102 to receive RF signals 108 from at least one source in an RF scene 109 within a field of view of the receiver. The RF imaging receiver is a subsystem that receives and processes electromagnetic radiation in the RF band including frequencies between 0 GHz and 300 GHz or a narrower mmW band including frequencies between 30 GHz and 300 GHz using photonic spatial beam processing in a manner making possible the reconstruction of an image of the RF scene 109.

The architecture of the RF imaging receiver converts received RF signals to corresponding optical signals to leverage compact lightweight optical components, optical detection and optical processing capabilities. Only the front end phased-array antenna is implemented in the RF region of the electromagnetic spectrum. Implementation of an end-to-end RF imaging system would be bulky, expensive and beyond the processing capabilities of current electronics. A more complete description of an exemplary architecture is described in Christopher A. Schuetz et. al "A Promising Outlook for Imaging Radar: Imaging Flash Radar Realized Using Photonic Spatial Beam Processing" IEEE Microwave Magazine, vol. 19.3.91-101 (2018) and in related U.S. Pat. No. 10,164,712 entitled "Phased-Array Radio Frequency Receiver" issued Dec. 25, 2018 the contents of which are hereby incorporated by reference.

An RF front end 110 includes an RF phased array antenna 112 with a plurality of antenna elements 114 positioned within electronic aperture 102 in a first pattern. The received RF signals 108 at each antenna element 114 are suitably amplified by low noise amplifiers (LNAs) 116 and output via wires 118.

An optical back end 119 includes an optical upconverter 120 that suitably includes an array of electro-optical (E/O) modulators 122 fed by a common optical local oscillator signal ω1 from an optical local oscillator 124 and the respective RF signals from wires 118 and upconverts each RF signal to a corresponding modulated optical signal 125, which may pass through optical filters 126. A plurality of optical channels 128 (such as optical fibers) are configured to carry the plurality of modulated optical signals 125. Each of the plurality of optical channels having an output to emanate the corresponding modulated optical signal out of the corresponding optical channel with the outputs of the plurality of optical channels arranged in a second pattern corresponding to the first pattern.

An optical imager 130 provides a first composite signal channel, adjacent to the plurality of outputs of the plurality of optical channels 128, configured to receive the plurality of modulated optical signals to form a composite optical signal 132. Optical imager 130 includes an optical beam combiner 134 having a first input couple to the outputs of the plurality of optical channels 128 arranged in a second pattern corresponding to the first pattern and a second input fed by optical local oscillator signal ω2 from optical local oscillator 124. An optic 136 images the optical local oscillator signal ω2 onto an internal interface 137 of the beam combiner. As used herein, an "optical beam combiner" is any passive optical system that has at least two inputs and at least one output, the light at the output (i.e., the composite optical signal) being a linear combination of the light at the inputs. The composite optical signal is formed at the internal interface 137 of the optical beam combiner but is not useful until it exits the beam combiner at the output. The beam combiner may be a partially silvered mirror, for example, or it may include powered elements such as lenses. In some embodiments, it may include, for example, a grating or prism to combine different wavelengths. The patterns "correspond" when the physical arrangement of the optical fibers is the same as the physical arrangement of the antenna elements. The spacing of the optical fibers and antenna elements is different due to the different wavelengths. Detector optics 138 focus the composite optical signal 132 into a spot 133 on an optical detector array 140 to form an image of the at least one source in the RF scene. For an object in the far-field, the spot will appear as essentially a single spot. For an object in the near-field, the spot will appear as the superposition of many spots from different locations on the object. The "spot" is depicted herein as a single circle for illustration purposes only.

In some embodiments, each E/O modulator 122 is a phase modulator, which may include a nonlinear crystal (e.g., a lithium niobate crystal) the index of refraction of which depends on an electric field applied across it. In operation, a RF tone received by one of the antenna elements 114, amplified by one of the low noise amplifiers 116 and input to one of the E/O modulators 122 may cause phase modulation of the optical local oscillator signal, resulting, at the output of the E/O modulator 124, in a signal (the modulated optical signal) including a carrier component, an upper sideband, and a lower sideband. For large modulation depth, other sidebands may also be present, and the carrier may be suppressed (or entirely absent, if the modulation depth corresponds to a zero of the zeroth Bessel function of the first kind).

The phase of the upper sideband may be equal to the sum of the phase of the optical local oscillator signal and the phase of the RF tone. The output of each phase modulator may be connected to filter 126 (e.g., a high-pass or band-pass filter) that allows the upper modulation sideband to pass and rejects or blocks the carrier and the lower modulation sideband. As such, each of the modulators in such an embodiment acts as a phase-preserving frequency converter. An amplitude modulator (e.g., an electro-absorption modulator or a Mach-Zehnder interferometer having a phase modulator in each arm, the phase modulators being driven in opposite directions by the radio frequency modulating signal), similarly followed by a filter that passes one modulation sideband while blocking the carrier and the other modulation sideband, may similarly act as a phase-preserving frequency converter.

The phase-preserving property of the phase-preserving frequency converters may make it possible to form, on the optical detector array 140, an optical image of the RF scene on the target. For example, near-planar RF waves received by the phased array antenna 112 from a distant RF point source may have a phase that varies nearly linearly across the antenna elements of the array antenna, with a phase slope across the array antenna corresponding to the direction from which the waves arrive. This phase slope may be preserved at the outputs of the optical upconverter 120, causing the optical detector optics 138 to focus the optical signal at the output of the optical converter 120 to a single detector in the optical detector array 140, the location of the point corresponding to the direction from which the RF waves arrive at the phased array antenna 112.

Each detector in the optical detector array 140 converts the received light into electric charge. A read out integrated circuit (ROIC) 150 measures the electric charge over a specified interval and outputs digital signals proportional to the charge. A processing circuit 152 converts this digital signal into the proper format to create an optical image of the scene. The optical detector array 140 may periodically be reset and the time interval between any such reset, and a subsequent read-out of the cumulative photon detections since the reset may be referred to as a "frame". The processing circuit 152 may receive data from the detectors in the optical detector array 140 from the read out integrated circuit 150 and cause a display to display images of the RF scene 109.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single circuit wiring board (PCB) or distributed over several interconnected PCBs. A processing circuit may contain other processing circuits; for example a processing circuit may include two processing circuits, an FPGA and a CPU, interconnected on a PCB.

Figure 2:
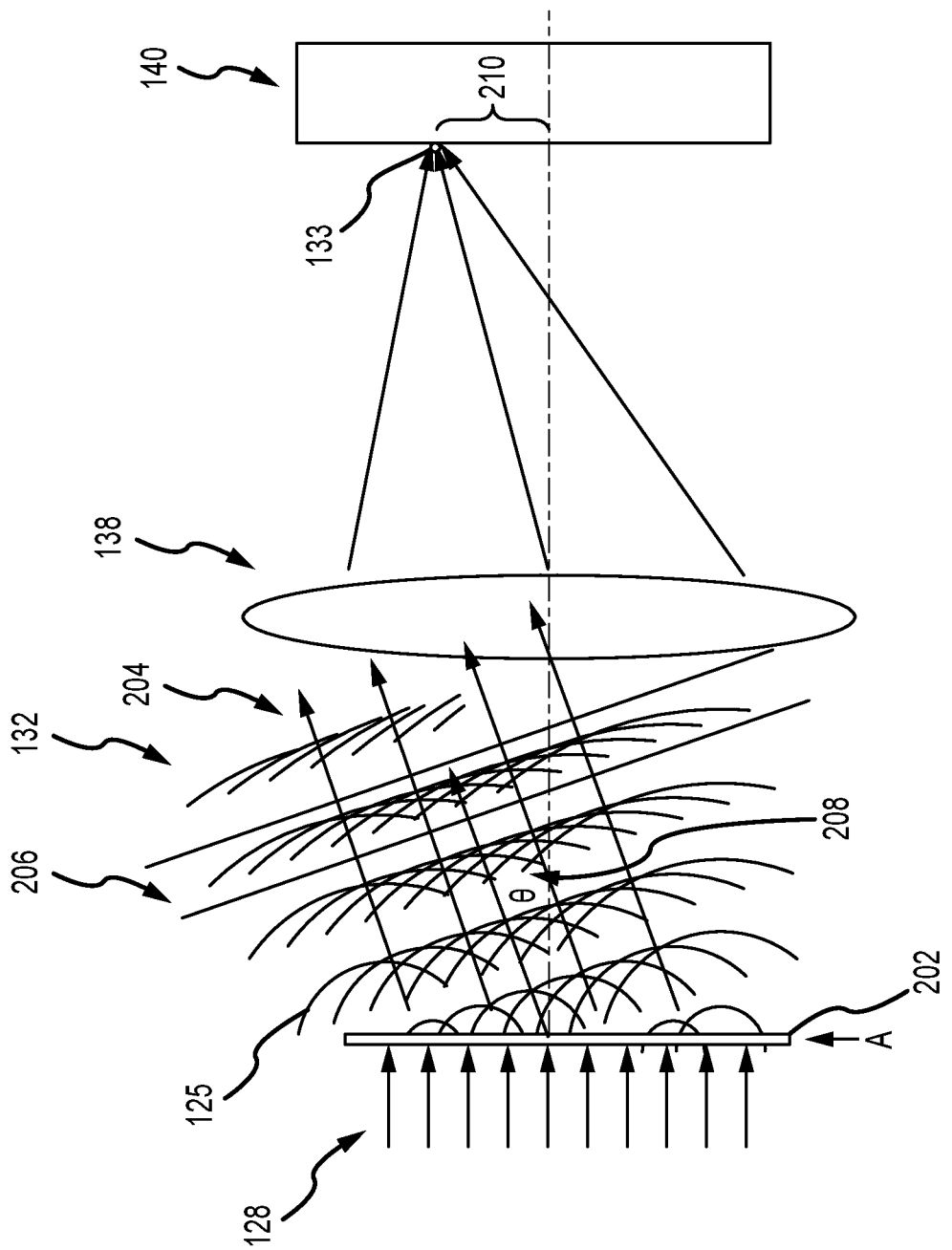
FIG. 2 is a diagram of an optical beam steerer acting on the individual modulated optical signals to induce individual phase delays that produce a linear phase delay across a two-dimensional wavefront of the composite optical signal to steer the composite optical signal and move the location of the spot on the optical detector.

In accordance with the present invention, a controller 200 and an optical beam steerer 202 are configured to act on the individual modulated optical signals 125 to induce individual phase delays 204 on those modulated optical signals 125 that produce a phase delay 206 with a linear term across a two-dimensional wavefront of the composite optical signal 132 as shown in FIG. 2. When the phase delay of each modulated optical signal 125 is increased in either the X or Y direction (or a combination thereof) the two-dimensional wavefront of the composite optical exhibits phase delay 206. To move UP, apply a linear phase shift that DECREASES from top to bottom. To move DOWN, apply a linear phase shift that INCREASES from top to bottom. To move LEFT apply a linear phase shift on the channels that DECREASES from left to right, and to move RIGHT a linear phase shift that INCREASES from left to right. The phase delay 206 produces a steering angle θ 208, which is dependent on the number and spacing of the individual optical channels, wavelength of light and the linear phase delay. In this embodiment, the phase delay is linear. The individual phase shifts 204 all point (steer) in the same direction such that the two-dimension wavefront of the composite signal exhibits a linear phase shift 206. Detector optics 138 converts steering angle to an offset 210 to move the location of spot 133 on the optical detector array 140. In this particular embodiment, optical beam steerer 200 is positioned in front of the optical imager 130 at the input to the optical beam combiner 134 and adjacent to the plurality of outputs of the plurality of optical channels 126, configured to receive the plurality of modulated optical signals.

Figure 3:
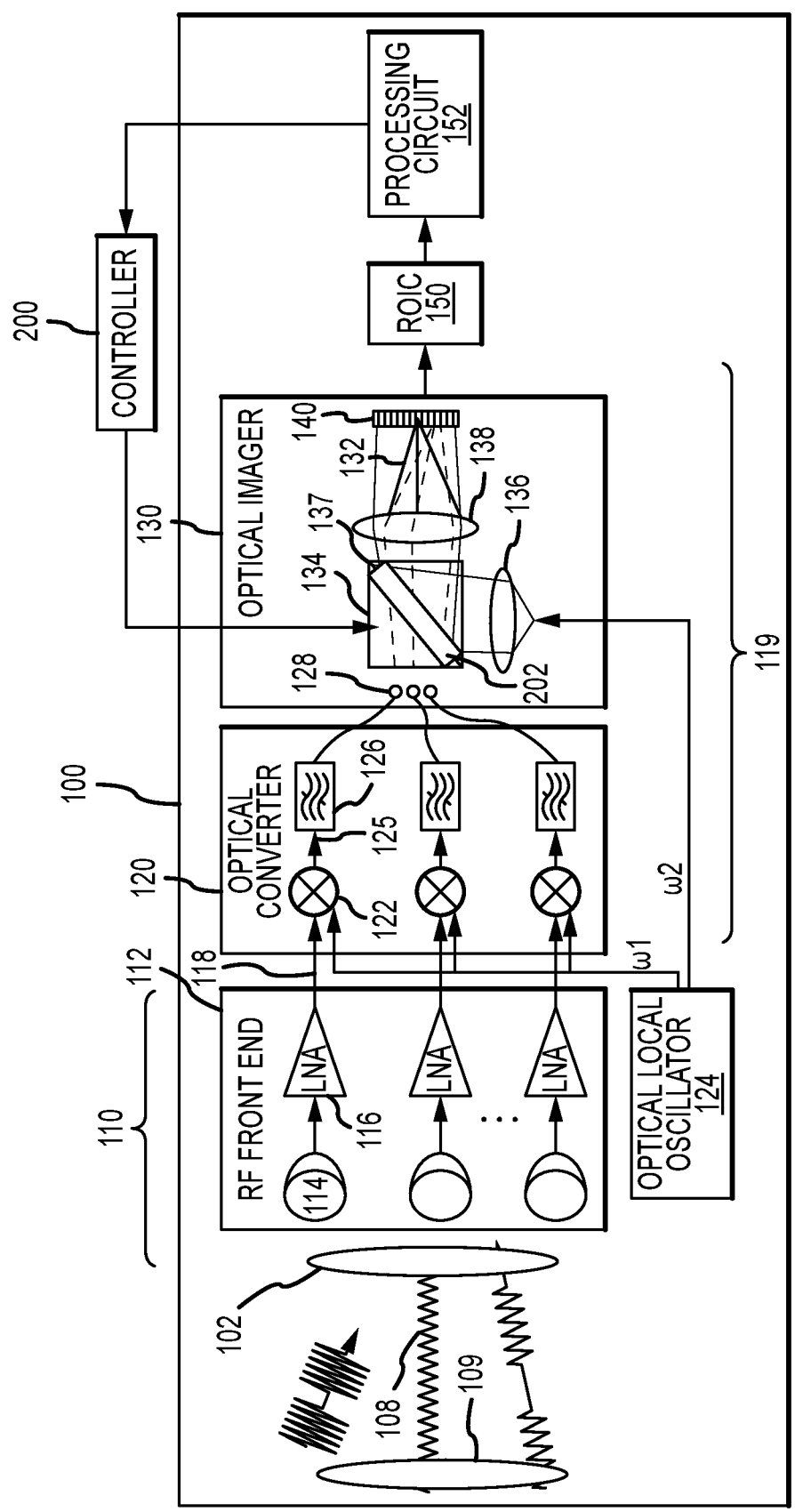
FIG. 3 is a block diagram of another embodiment of an optically-steered RF imaging receiver using photonic spatial beam processing.

Referring now to FIG. 3, in another embodiment optical beam steerer 202 is positioned at the internal interface 137 of the optical beam comber 134. In general, the optical beam steerer can be positioned anywhere between the plurality of outputs of the plurality of optical channels 126 and the formation of the composite optical signal at the internal interface.

Figure 4A:
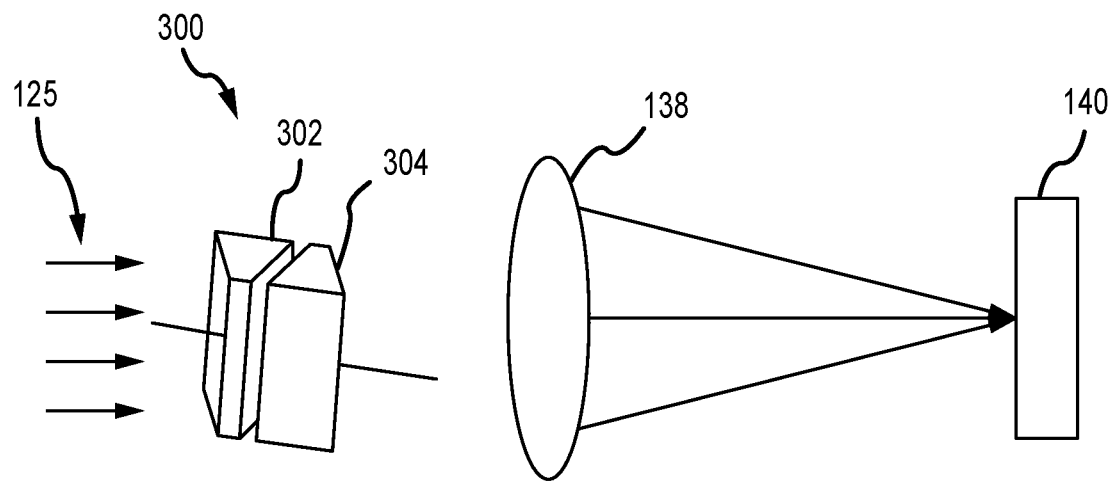
FIGS. 4a through 4c are diagrams of an embodiment of an optical beam steerer implemented with a Risley prism.
Figure 4B:
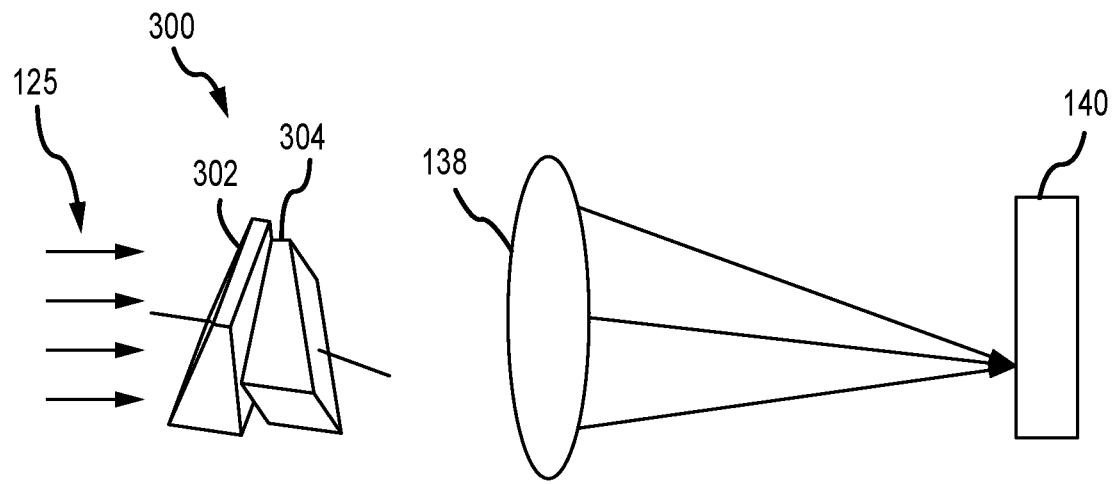
Figure 4C:
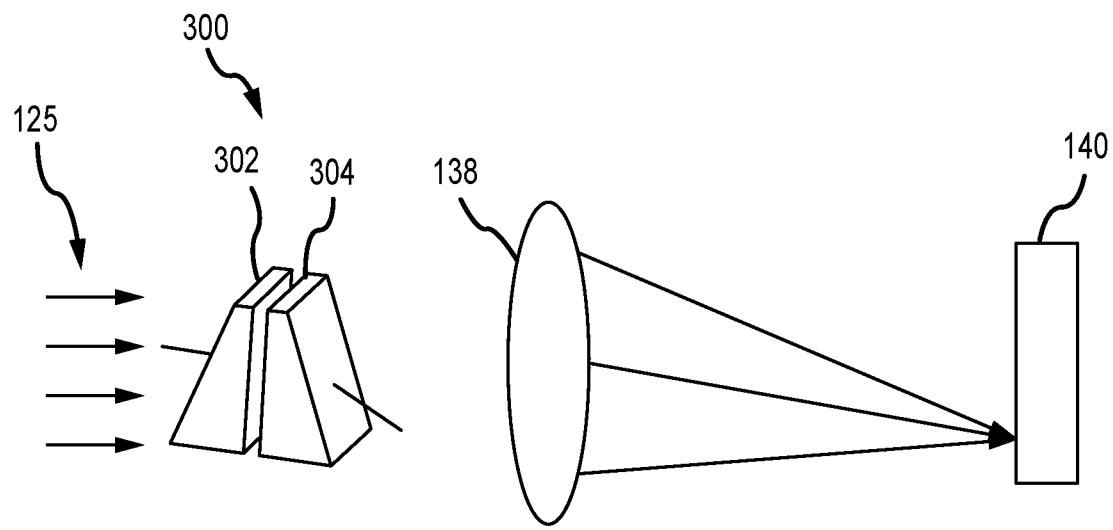

Referring now to FIGS. 4a-4c, an embodiment of an optical beam steerer is implemented with a single Risley prism 300, which comprises one pair of optical prisms or "wedges" 302 and 304 that rotate relative to each other and relative to the modulated optical signals to induce the individual phase delays on the individual modulated optical signals 125. When the wedges angle in the same direction, the angle of the refracted beam becomes greater. When the wedges are rotated to angle in opposite directions, they cancel each other out, and the beam is allowed to pass straight through. The Risley prism works by controlling the relative path lengths through which the individual modulated optical signals must pass through the glass material of the prism. The composite optical signal is steered at angle theta and detector optics 138 maps the angle to an offset to move the location of the spot 133 on the optical detector array 140. EMI won't change the material properties of the wedges, hence the Risley prism is immune to its effects.

Figure 5A:
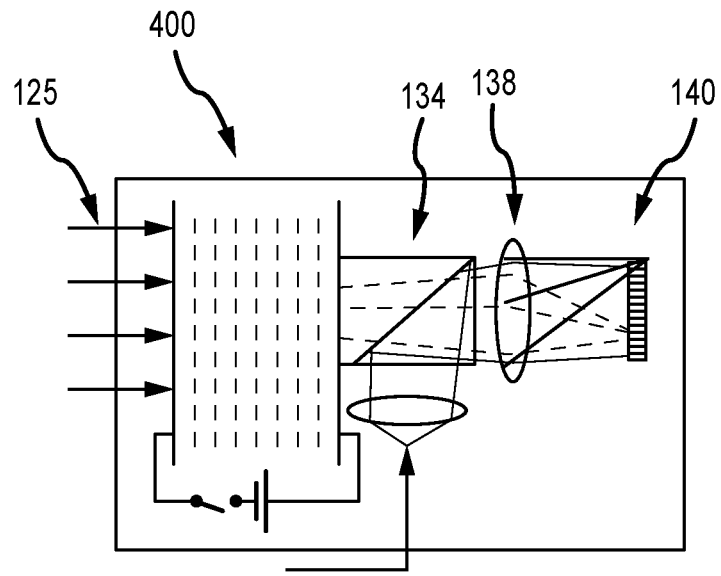
FIGS. 5a and 5b are diagrams of an optical beam steerer implemented with a liquid crystal spatial light modulator positioned at the input and internal interface of the beam combiner, respectively.
Figure 5B:
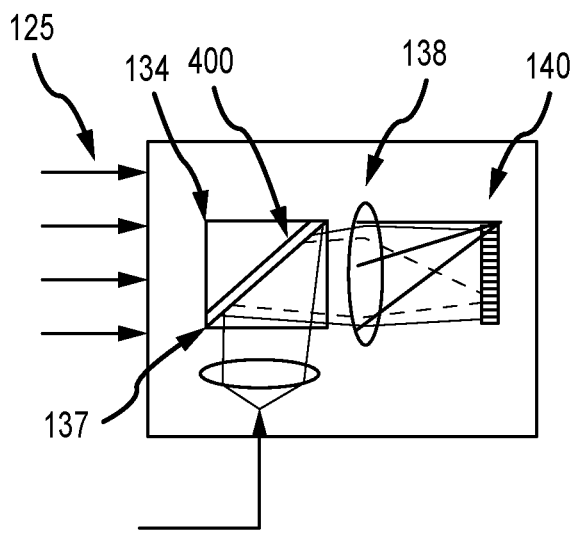

Referring now to FIGS. 5a and 5b, an optical beam steerer is implemented with a liquid crystal SLM 400 positioned at the input to the optical beam combiner 134 and the internal interface 137 of the beam combiner, respectively, in a transmissive mode of operation. Alternately, the SLM could be configured to operate in a reflective mode by incorporating fold mirror(s) into the optical path. In the liquid crystal SLM, a single pixel or group of pixels is mapped to each of the individual modulated optical signals 125. The single pixels or groups of pixels are individually addressable in order to control the refractive indices of the pixels or group of pixels to act on the individual modulated optical signals to induce individual phase delays that produce a linear phase delay across a two-dimensional wavefront of the composite optical signal. Because the LC SLM is electrically driven it may be susceptible EMI. Any effects on the electrical bits may be reflected in changes to the optical bits. In a similar embodiment, a MEMs SLM may be used to provide beam steering via path length variation. Similar to the LC SLM, a mirror or group of mirrors is mapped to each of the individual modulated optical signals and is individually addressable to control the mirror or group of mirrors to change the relative path lengths between the individual modulated optical signals. Because the MEMs SLM is electrically driven it also is susceptible to EMI.

In the general case, the optical beam steerer is controlled to induce phase delays to the individual modulated optical signals (or "channels") that produce a phase delay having only a linear term across the two-dimensional wavefront of the composite optical signal. The slope associated with that linear term dictating, in part, the steering angle. A single Risley prism may induce phase shifts to the individual channels to provide a linear phase shift.

SLMs such as the LC or MEMS SLM provide the capability to address each channel independently. In some cases, it may be desirable to change the individual phase delays applied to the channels independently thereby producing a non-linear phase delay across the two-dimensional wavefront of the composite optical signal. Depending on how the individual phase is changed, the non-linear phase delay may include spherical or aspherical terms in addition to the linear phase term. The linear phase term dictates the coarse steering of the composite optical signal. Spherical and aspherical terms allow for the fine-tuning of the steering angle through methods such as focusing power and wavefront correction. The SLM may be controlled to change the individual phase delays one at a time to make incremental changes to the phase delay across the two-dimensional wavefront.

Figure 6A:
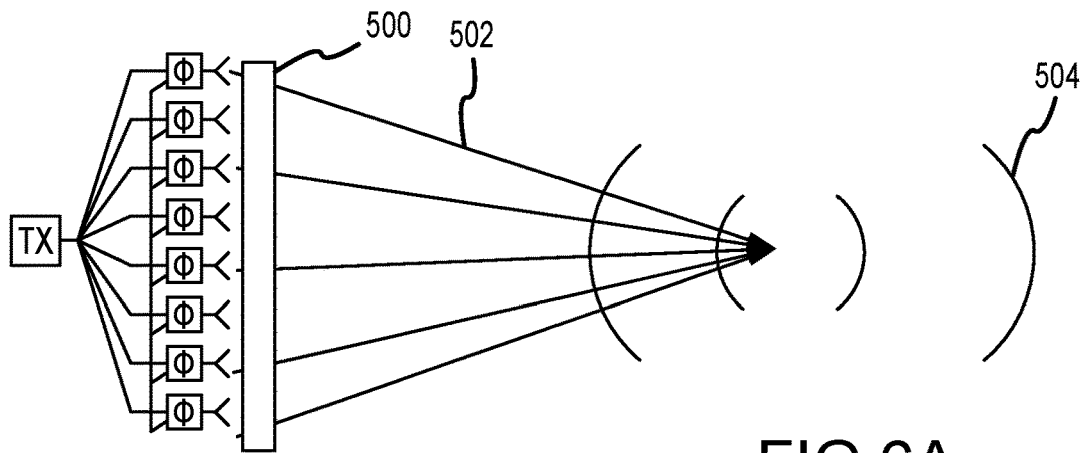
FIGS. 6a through 6c are diagrams illustrating independent control of the phase of each individual modulated optical signal to induce spherical or aspheric terms into the phase delay across the two-dimensional wavefront of the composite optical signal.
Figure 6B:
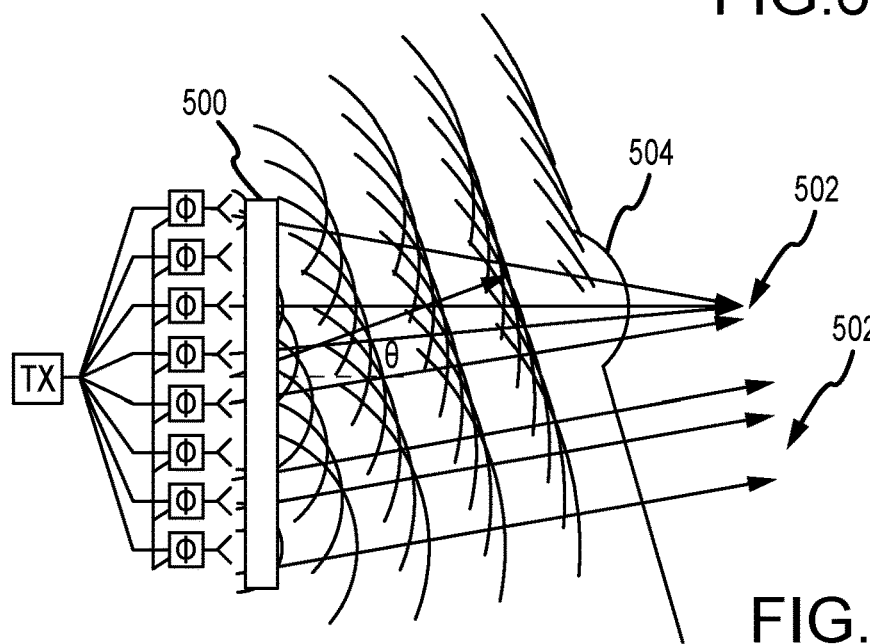
Figure 6C:
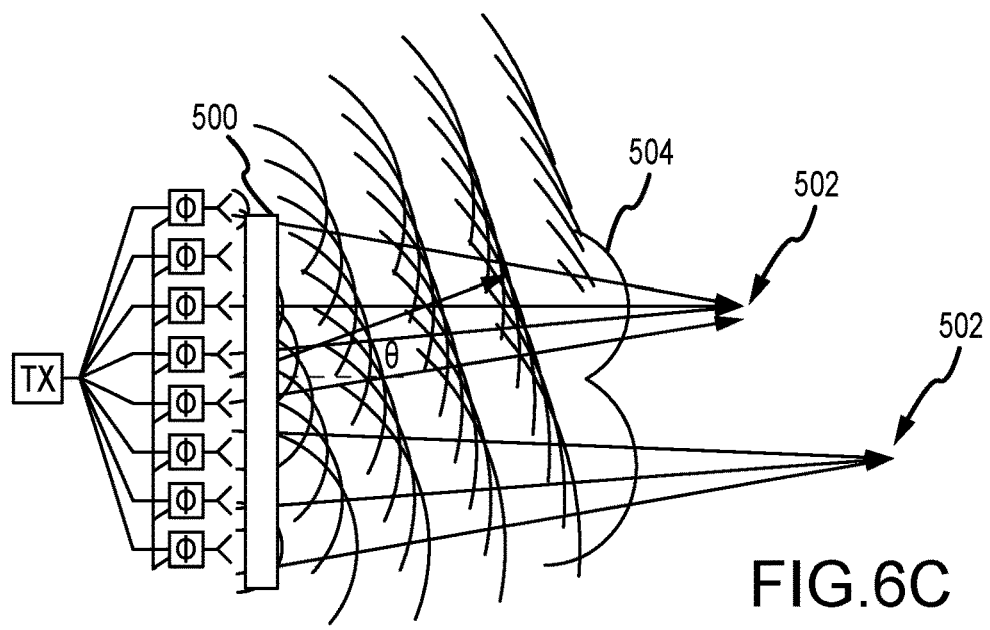

As shown in FIG. 6a, SLM 500 acts on the individual modulated optical signals 502 to induce a spherical term such that the signals focus at a point. The two dimensional wavefront 504 will have a curvature. If the linear term is zero, the curvature will be the radius of a circle. As shown in FIG. 6b, SLM 500 acts on the individual modulated optical signals 502 to induce an aspherical term that bends some of the signals 502. The two dimensional wavefront 504 has a curvature that changes across the wavefront. As shown in FIG. 6c, SLM 500 acts on the individual modulated optical signals 502 to induce two different spherical term such that the signals focus at two different points. The ability through the SLM to independently control the phase delay to the different channels allows for more flexible control over the two-dimensional wavefront to finely steer the composite optical signal to improve detected power on the optical detector array. Furthermore, the SLM can be controlled to make the changes to the phase delays on the different channels incrementally, or one at a time, to better control the steering angle and improve detected power.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optically-steered RF imaging receiver, comprising:
a phased-array antenna including a plurality of antenna elements arranged in a first pattern configured to receive RF signals from at least one source;
a plurality of electro-optic modulators corresponding to the plurality of antenna elements, each modulator configured to modulate an optical carrier with a received RF signal to generate a plurality of modulated optical signals;
a plurality of optical channels configured to carry the plurality of modulated optical signals, each of the plurality of optical channels having an output to emanate the corresponding modulated optical signal out of the corresponding optical channel, the outputs of the plurality of optical channels arranged in a second pattern corresponding to the first pattern;
a composite signal channel, adjacent to the plurality of outputs of the plurality of optical channels, comprising a beam combiner having a first input configured to receive the plurality of modulated optical signals and a second input fed by a optical local oscillator signal and an internal interface at which the modulated optical signals and the optical local oscillator signal are combined to form a composite optical signal;

an optical detector array configured to receive at least a portion of the composite optical signal that is focused into a spot and to extract an image of an RF scene from the composite optical signal; and an optical beam steerer positioned either at the first input of the beam combiner or at the internal interface, said optical beam steerer comprising a Risley prism including one pair of optical prisms that rotate relative to each other and relative to the modulated optical induce individual phase delays on the individual modulated optical signals that produce a phase delay with a linear term across a two-dimensional wavefront of the composite optical signal to steer the composite optical signal at a steering angle and move the location of the spot on the optical detector array.

2. The optically-steered RF imaging receiver of claim 1, wherein the received RF signals occupy any portion of the RF spectrum from 0-300 GHz and the optical signals occupy a portion of the near infrared (NIR) spectrum between 0.7 and 3.0 microns.

3. An optically-steered RF imaging receiver comprising:
a phased-array antenna including a plurality of antenna elements arranged in a first pattern configured to receive RF signals from at least one source;
a plurality of electro-optic modulators corresponding to the plurality of antenna elements, each modulator configured to modulate an optical carrier with a received RF signal to generate a plurality of modulated optical signals;
a plurality of optical channels configured to carry the plurality of modulated optical signals, each of the plurality of optical channels having an output to emanate the corresponding modulated optical signal out of the corresponding optical channel, the outputs of the plurality of optical channels arranged in a second pattern corresponding to the first pattern;
a composite signal channel, adjacent to the plurality of outputs of the plurality of optical channels, comprising a beam combiner having a first input configured to receive the plurality of modulated optical signals and a second input fed by a optical local oscillator signal and an internal interface at which the modulated optical signals and the optical local oscillator signal are combined to form a composite optical signal;
an optical detector array configured to receive at least a portion of the composite optical signal that is focused into a spot and to extract an image of an RF scene from the composite optical signal; and
an optical beam steerer positioned either at the first input of the beam combiner or at the internal interface, said optical beam steerer comprising a liquid crystal or MEMs spatial light modulator configured to act on the individual modulated optical signals to induce individual phase delays that produce a phase delay with a linear term across a two-dimensional wavefront of the composite optical signal to steer the composite optical signal at a steering angle and move the location of the spot on the optical detector array.

4. The optically-steered RF imaging receiver of claim 3, wherein the received RF signals occupy any portion of the RF spectrum from 0-300 GHz and the optical signals occupy a portion of the near infrared (MR) spectrum between 0.7 and 3.0 microns.

5. The optically-steered RF imaging receiver of claim 3, wherein the spatial light modulator is configured to act independently on the individual modulated optical signals to change the individual phase delays one at a time to add spherical or aspherical terms to the phase delay to fine tune the steering angle of the composite optical signal.

6. A method of RF signal processing, comprising:
receiving an incoming RE signal at each of a plurality of antenna elements that are arranged in a first pattern;
modulating the received RE signals from each of the plurality of antenna elements onto an optical local oscillator signal to generate a plurality of modulated optical signals, each modulated signal having at least one sideband;
directing each of the plurality of modulated optical signals along a corresponding one of a plurality of optical channels, each of the plurality of optical channels having an output, the outputs of the plurality of optical channels arranged in a second pattern corresponding to the first pattern;
forming a composite optical signal using light emanating from the outputs of the plurality of optical channels and focusing the composite optical signal into a spot:
extracting with an optical detector array, from the spot, an image of an RF scene contained in at least one of the received RE signals; and
using a Risley prism including one pair of optical prisms that rotate relative to each other and relative to the modulated optical signals to act on the individual modulated optical signals to induce the individual phase delays that produce a linear phase delay across a two-dimensional wavefront of the composite signal to move the location of the spot on the optical detector.

7. A method of RF signal processing, comprising:
receiving an incoming RF signal at each of a plurality of antenna elements that are arranged in a first pattern;
modulating the received RE signals from each of the plurality of antenna elements onto an optical local oscillator signal to generate a plurality of modulated optical signals, each modulated signal having at least one sideband;
directing each of the plurality of modulated optical signals along a corresponding one of a plurality of optical channels, each of the plurality of optical channels having an output, the outputs of the plurality of optical channels arranged in a second pattern corresponding to the first pattern;
forming a composite optical signal using light emanating from the outputs of the plurality of optical channels and focusing the composite optical signal into a spot;
extracting with an optical detector array, from the spot, an image of an RF scene contained in at least one of the received RF signals; and
using a liquid crystal spatial or a MEMs spatial light modulator to act on the individual modulated optical signals to induce the individual phase delays that produce a linear phase delay across a two-dimensional wavefront of the composite signal to move the location of the spot on the optical detector.

8. The method of claim 7, further comprising using the spatial light modulator to act independently on the individual modulated optical signals to change the individual phase delays one at a time to add spherical or aspherical terms to the phase delay to fine tune the steeling angle of the composite optical signal.

* * * * *

UNITED STATES PATENT AND TRADEMARK OFFICE
CERTIFICATE OF CORRECTION

PATENT NO. : 11,212,010 B2  
APPLICATION NO. : 16/821530  
DATED : December 28, 2021  
INVENTOR(S) : Uyeno et al.

Page 1 of 2

It is certified that error appears in the above-identified patent and that said Letters Patent is hereby corrected as shown below:

In the Specification

In Column 1, Line 18, after "interest.", delete a linebreak

In Column 4, Line 19, delete "RE." and insert --RF.-- therefor

In Column 5, Line 48, delete "124," and insert --122,-- therefor

In Column 6, Line 15, delete "converter" and insert --upconverter-- therefor

In Column 7, Line 10, delete "200" and insert --202-- therefor

In Column 7, Line 13, delete "126," and insert --128,-- therefor

In Column 7, Line 17, delete "comber" and insert --combiner-- therefor

In Column 7, Line 19, delete "126" and insert --128-- therefor

In the Claims

In Column 9, Line 16, in Claim 1, after "optical", insert --signals to--

In Column 9, Line 28, in Claim 3, after "receiver", insert --,--

In Column 10, Line 2, in Claim 4, delete "(MR)" and insert --(NIR)-- therefor

In Column 10, Line 12, in Claim 6, delete "RE" and insert --RF-- therefor

In Column 10, Line 14, in Claim 6, delete "RE" and insert --RF-- therefor

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,212,010 B2

In Column 10, Line 27, in Claim 6, delete "spot:" and insert --spot;-- therefor

In Column 10, Line 30, in Claim 6, delete "RE" and insert --RF-- therefor

In Column 10, Line 42, in Claim 7, delete "RE" and insert --RF-- therefor

In Column 11, Line 2, in Claim 8, delete "steeling" and insert --steering-- therefor